United States Patent
Karlsson et al.

(10) Patent No.: US 6,817,558 B1
(45) Date of Patent: Nov. 16, 2004

(54) PARALLEL SIZING, DOSING AND TRANSFER ASSEMBLY AND METHOD OF USE

(75) Inventors: Arne Karlsson, Oslo (NO); Ivar M. Dahl, Oslo (NO); Freddy Olsen, Hole in Buskerud (NO); Ara J. Alexanian, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/128,885

(22) Filed: Apr. 23, 2002

(51) Int. Cl.[7] .............................................. B02C 19/00
(52) U.S. Cl. ....................................................... 241/30
(58) Field of Search ............................. 241/134, 24.1, 241/30, 100, 175

(56) References Cited

U.S. PATENT DOCUMENTS 5,342,581 A    8/1994   Sanadi ........................ 422/101
6,132,157 A *  10/2000  Comardo ....................... 414/160
2002/0014546 A1 * 2/2002 Lugmair et al. ............. 241/134

FOREIGN PATENT DOCUMENTS

DE          19809477 A1     9/1999
WO          WO 02/04121 A2  1/2002

* cited by examiner

Primary Examiner—Mark Rosenbaum
(74) Attorney, Agent, or Firm—John G. Tolomei; Frank S. Molinaro; Maryann Maas

(57) ABSTRACT

The method and assembly accommodate parallel processing of a plurality of materials such as catalysts simultaneously through use of interactive modules for sizing of material particles to predetermined substantially identical size, for collecting a substantially identical dose of each material, for feeding the dose of each material into a reactor vessel, and for maintaining integrity of the modules, or units thereof, intact during interaction between structures so no particulate material is lost during necessary processing for ultimate efficacy testing in a least compromised manner.

17 Claims, 19 Drawing Sheets

FIG. 4A
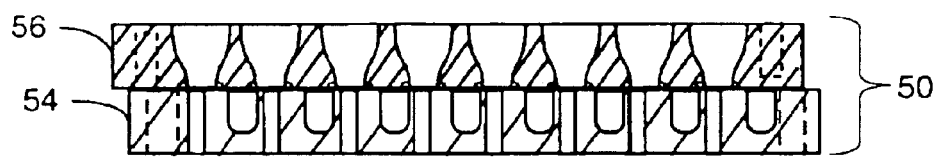
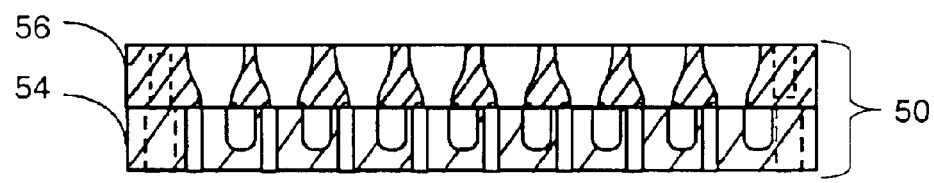
FIG. 4B
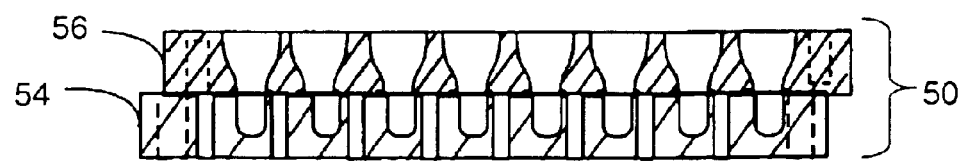
FIG. 4C

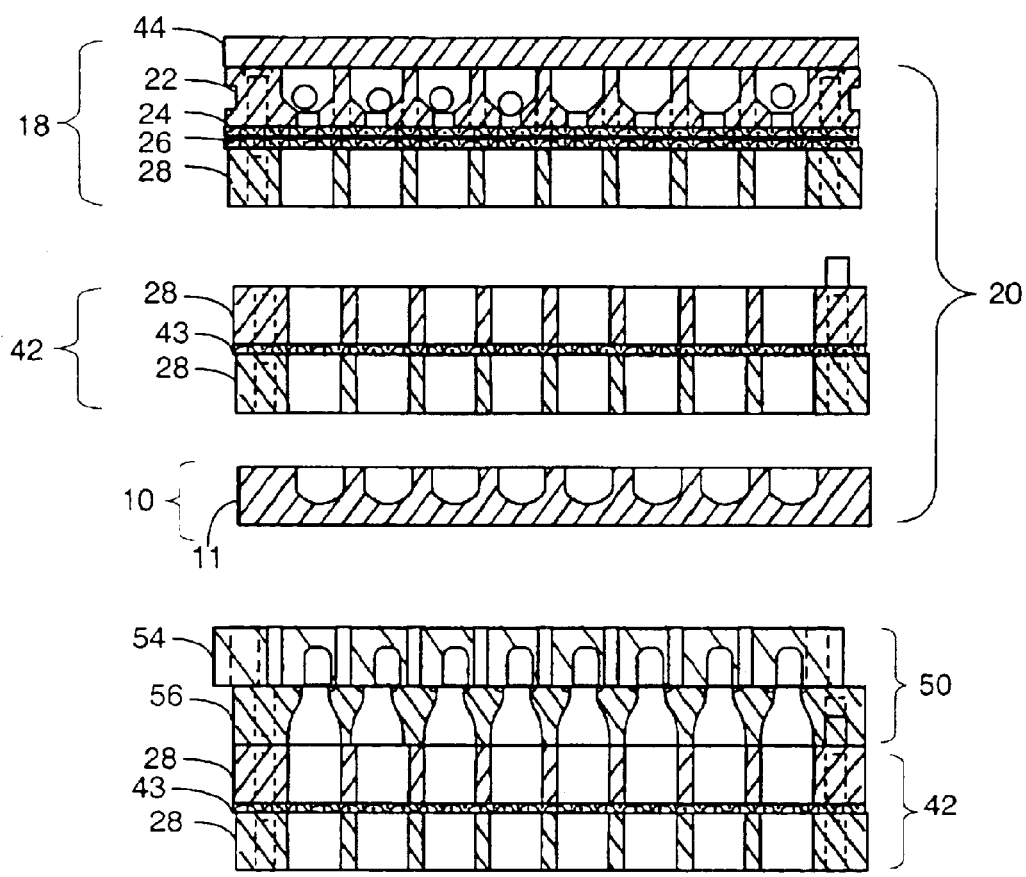
FIG. 5A
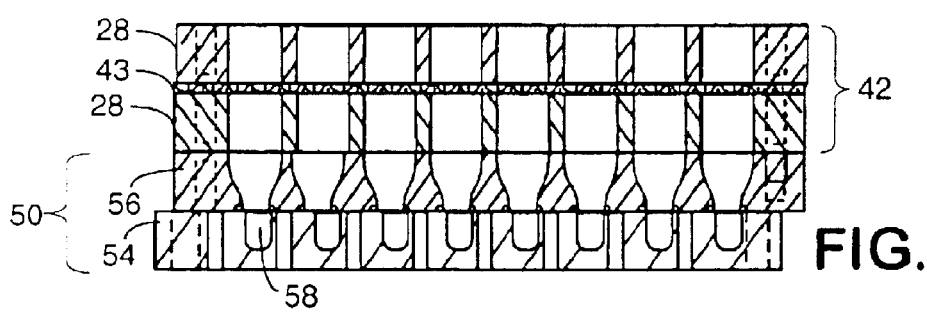
FIG. 5B
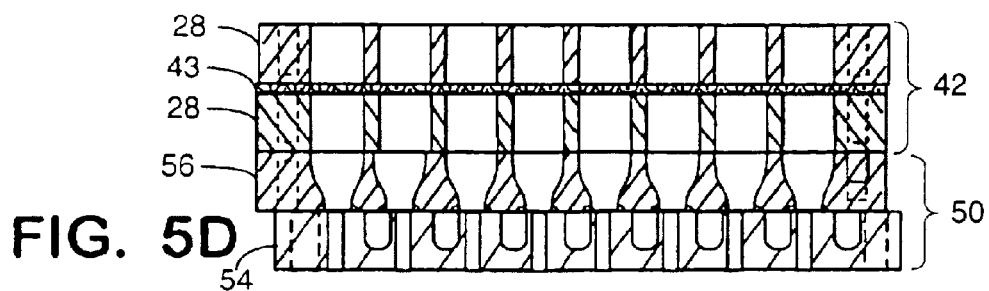
FIG. 5C
FIG. 5D

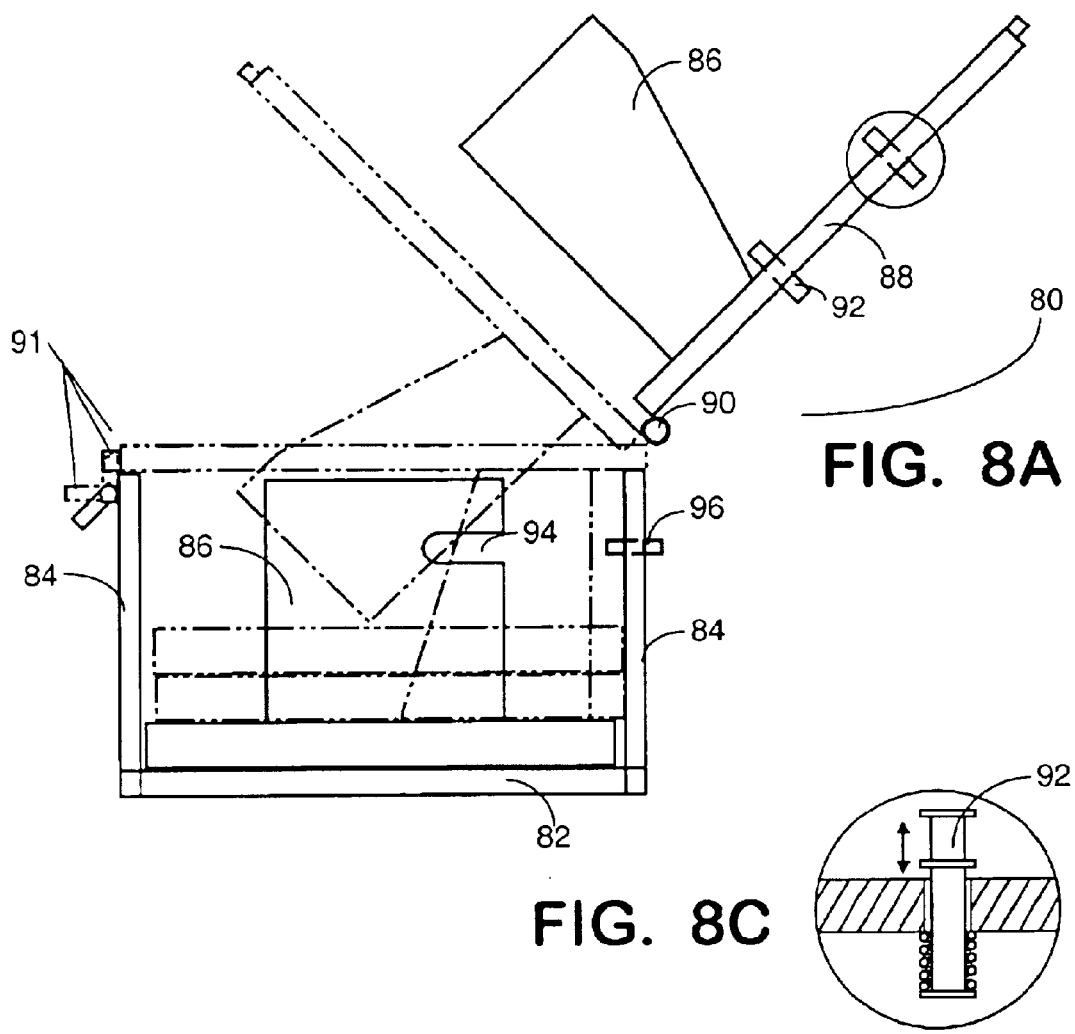
FIG. 8A
FIG. 8C
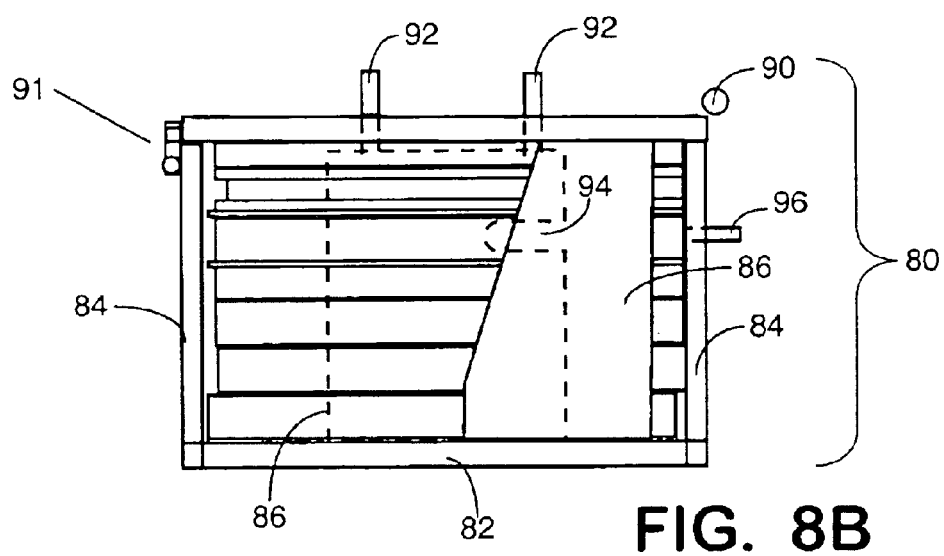
FIG. 8B

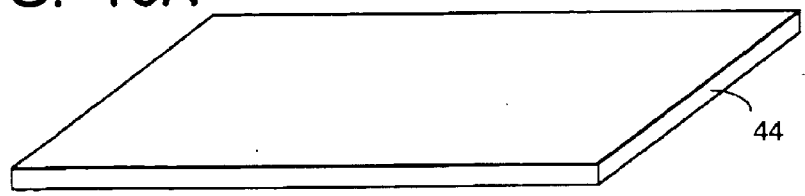
FIG. 16A
FIG. 16B
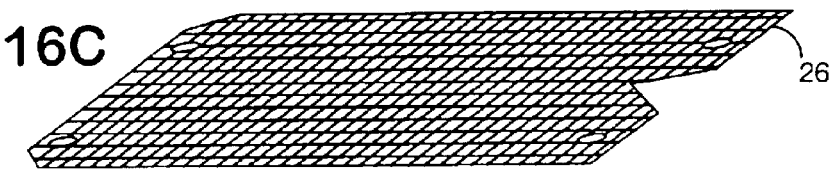
FIG. 16C
FIG. 16D
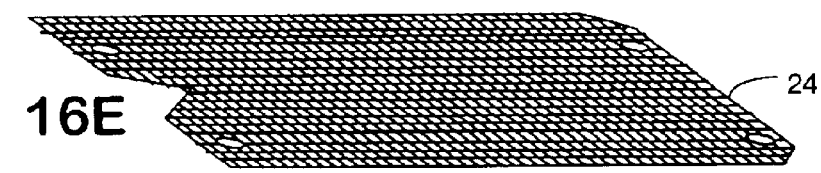
FIG. 16E
FIG. 16F
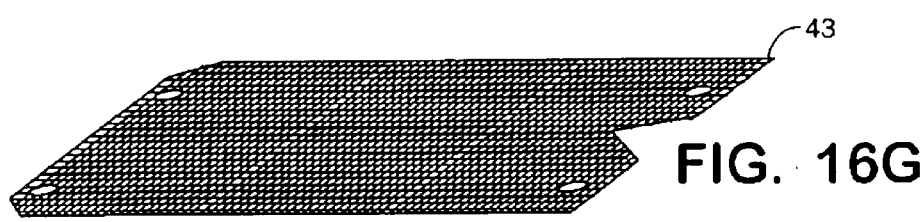
FIG. 16G
FIG. 16H

FIG. 17A
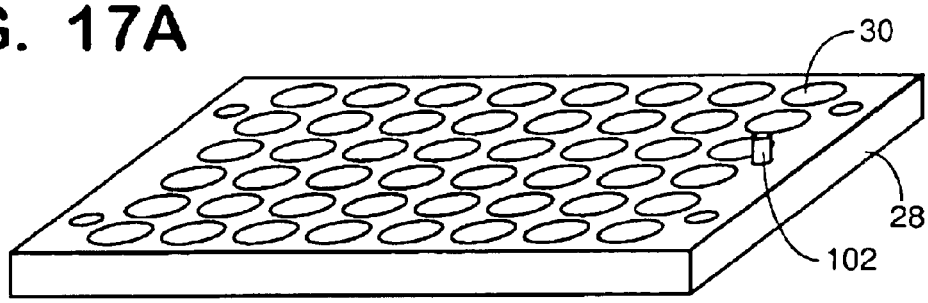
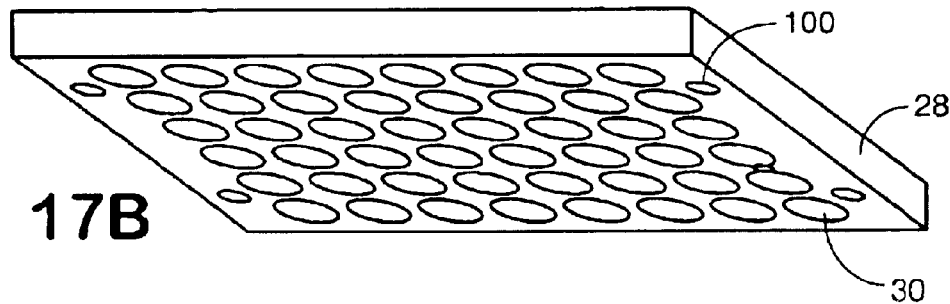
FIG. 17B
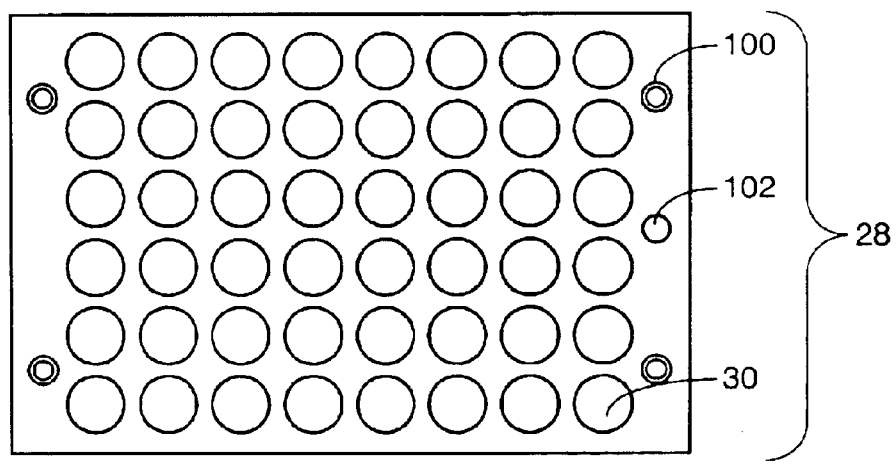
FIG. 17C
FIG. 17D

US 6,817,558 B1

PARALLEL SIZING, DOSING AND TRANSFER ASSEMBLY AND METHOD OF USE

FIELD OF THE INVENTION

The present invention relates to the field of combinatorial chemistry and more particularly to the field of parallel catalyst testing, where a plurality of catalysts are simultaneously tested, for efficacy thereof, typically within parallel reactors. More particularly, the invention relates to an assembly for use in parallel sizing, dosing, and transferring of materials such as catalysts and the method of use thereof.

BACKGROUND OF THE INVENTION

In the field of combinatorial chemistry within, for example, catalyst preparation and testing, there is a need for practical handling tools in the form of handling assemblies, that can be used during various manipulations and transfers of catalysts and/or samples thereof. The need for such equipment becomes pressing the moment the number of samples to be handled daily increases beyond a number of, for instance, 10 to 100, and becomes an absolute prerequisite for combinatorial activities in general, when the number of samples to be tested increase beyond 1,000–10,000 or more per day.

Such assemblies can be used for transfer between various dedicated pieces of equipment, such as, for example, a parallel synthesis block, a parallel reactor, a parallel sample holder for analysis, and so forth. Such assemblies can also be designed to perform various operations on the samples, such as grinding and sizing of particles, as well as volumetric dosing of multiple samples, performed in parallel.

Fundamental to parallel handling/processing is that all activities, from preparation to final testing, be performed with a spatial format or footprint, such that all samples are identifiable by their position (spatially addressable format). Therefore all samples should maintain their positions, or easily be restorable to their original positions, during manipulations thereof.

The basic concept for the assembly of the present invention is to accommodate and perform all the normal steps in usual laboratory manipulation of a plurality of samples in a strictly parallel manner. With such assembly, the time consumed will, ideally, be the same for accommodating a large plurality of samples, as it would be for accommodation of a single sample. It is further a basic concept that various pieces or units can be combined creating modules of the assembly for performing a sequence of parallel handling steps in as few operations as possible, using the modules for parallel processing of the samples in an identifiable manner throughout processing.

The footprinted modules are formatted to a standard size, which may correspond to the commercial 48, 96, or 384 well format (or high-number standardized microplates), typically the industry standard for combinatorial equipment, to allow easy accommodation of commercially available equipment for use in processing.

During parallel processing all manipulations are performed with module units having identifiable (preferably identical) footprints, as opposed to serial manipulations of a single catalyst at a time, greatly enhancing efficiency of handling and manipulations and reducing the cost and time involved per experiment by several orders of magnitude.

As will be defined further hereinbelow, the assembly is modular with modules provided for grinding and sieving (sizing), precision volume dosing, transfer, etc., allowing for enhanced flexibility. For example, modules or units thereof can be modified or new modules or units created and incorporated should the need arise. Additionally, modules used, for example, in transfer, can be optimized/specialized. If transfer between different spatial formats becomes important, a format transform module could be incorporated into the handling assembly.

The description below will exemplify the invention as applied to grinding, sieving, dosing, transferring, etc., catalysts, but it is important to note that the invention may be used in conjunction with a wide range of other materials in addition to catalysts, such as, for example, catalyst precursors, catalyst supports, adsorbents, molecular sieves, zeolites, amorphous materials, ceramics, and pharmaceuticals. Further, samples of any of the above may be used as well, though this should not be construed as limiting.

Others have tried various techniques in parallel handling of materials, see WO 02/04121 (crushing and sieving a plurality of samples) and DE 19809477 A1 (loading device adapted for parallel transfer of catalysts to reactors through communication device), but the present invention provides a rapid, reliable, method and apparatus to introduce a substantially identical volume of a plurality of materials to an array of vessels.

SUMMARY OF THE INVENTION

According to the invention there is provided an assembly comprising interactive modules for substantially identically sizing, precision volume dosing and transferring of a plurality of materials simultaneously, in a spatially identifiable format, into, for example, an array of parallel reactors for testing the materials.

Further, according to the invention there is provided a method comprising the steps of:

obtaining a plurality of materials in a containment module wherein the materials are positioned in a spatially identifiable format;

when the materials need to be ground to a substantially similar particle size, transferring the materials to a sizing module;

grinding, separating and trapping ground particles of a predetermined size within the sizing module;

transferring the particles of predetermined size to a precision volume dosing module, from the sizing module;

trapping a precision volume dose of particles of each material in the dosing module;

eliminating any excess material from within the dosing module; and transferring the precision volume doses of material to a reactor feed module for loading the materials into an array of parallel reactors while maintaining the spatially identifiable format.

Still further according to the invention there is provided a method comprising the steps of:

obtaining a plurality of materials of substantially similar predetermined particle size, in a containment module wherein the materials are positioned in a spatially identifiable format;

transferring the materials of predetermined size to a precision volume dosing module, from the containment module;

trapping a precision volume dose of each material in the dosing module;

eliminating any excess material from within the dosing module; and transferring the precision volume doses of material to a vessel feed module for loading the materials into a parallel vessel while maintaining the spatially identifiable format.

Still further according to the invention there is provided an assembly comprising at least a containment module for containing a plurality of materials wherein each material is identifiable by its spatial orientation within the containment module; a precision volume dosing module for collecting from the containment module a precision volume of each material in a manner wherein spatial orientation is maintained, and a feed module by means of which the precision volume of each material is transferred to a feed conduit of the feed module, with a spatial orientation of the samples being maintained.

Yet further according to the invention there is provided an assembly comprising a containment module for containing a plurality of materials wherein each sample is identifiable by its spatial orientation within the containment module; a precision volume dosing module for collecting from the containment module a precision volume of each material in a manner wherein spatial orientation is maintained and a feed module by means of which the precision volume of each sample is transferred to a feed conduit feed module, with a spatial orientation of the samples being maintained. The assembly further includes a sizing module for use, when necessary, to provide particulate material with particles substantially identical in size, the sizing module receiving material from the containment module and providing particulate material of substantially identically sized particles to the precision volume dosing module.

BRIEF DESCRIPTION OF THE DRAWINGS

FIG. 4A is a cross sectional view through a precision volume dosing module showing same in a first position thereof.

FIG. 4B is a cross sectional view through the dosing module showing same in a second position thereof.

FIG. 4C is a cross sectional view through the dosing module showing same in a third position thereof.

FIG. 5A is a cross sectional view showing how units of the sizing module are separated to obtain catalyst particles of substantially similar predetermined size.

FIG. 5B is a cross sectional view showing a unit of the sizing module with the dosing module engaged thereover, the dosing module being illustrated in the third position thereof.

FIG. 5C is a cross sectional view of the structures of FIG. 5B in inverted position.

FIG. 5D is a cross sectional view similar to FIG. 5C but showing the dosing module now in the first position thereof.

FIG. 8A is a side view of a framework module of the assembly in an open position.

FIG. 8B is an opposite side view of the framework module.

FIG. 8C is an enlarged view of a clamping pin of the framework module in a closed position.

FIG. 16A is a perspective view of a solid plate of the sizing module.

FIG. 16B is a cross sectional view through the solid plate of FIG. 16A.

FIG. 16C is a perspective view of a coarse screen of the sizing module.

FIG. 16D is a cross sectional view through the coarse screen.

FIG. 16E is a perspective view of a fine screen of the sizing module.

FIG. 16F is a cross sectional view through the fine screen.

FIG. 16G is a perspective view of an ultrafine screen of the sizing module.

FIG. 16H is a cross sectional view through the ultra fine screen.

FIG. 17A is a perspective view of a passthrough plate of the sizing module.

FIG. 17B is a perspective bottom view of the passthrough plate.

FIG. 17C is a top plan view through the passthrough plate.

FIG. 17D is a cross sectional view through the passthrough plate.

DETAILED DESCRIPTION OF THE INVENTION

Parallel processing and combinatorial methods are not new, as iterated above. They have been extensively exploited in pharmaceutical research. Recently, combinatorial methods have migrated to other fields of chemistry and materials science; however, the type of assembly required for parallel processing is different in the field of, for example, catalyst preparation, from that utilized in the field of processing in a pharmaceutical laboratory.

The proposed method for combinatorial handling requires a plurality of modules, to be defined below, which cooperatively interact to form a processing assembly for grinding (if needed), sizing, precision volumetric dosing, and transfer or loading of particulate catalyst samples to a feed module, all of which are illustrated herein in an exemplary fashion, not to be construed as limiting to the scope of the invention.

Referring now to FIGS. 1A, 12A–D and 6A–C in greater detail, it will be understood that particulate catalysts are developed through upstream processes and may either be received in a footprinted or spatially identifiable containment module 10 comprising a plate 11 having wells 12 therein or may be obtained from a containment module 10 incorporating vials 13, also arranged in a spatially identifiable manner.

Up to a certain point in the methodology, catalyst sample processing may take one of two routes. Which route is taken is dependent upon whether or not the particulate catalyst samples need grinding, such as, for example, when grinding is necessary because particulate catalyst samples are secured directly from an upstream process, with catalyst particles being of various sizes.

Preferably, sizing of the catalyst particles for each sample is substantially identical, and within a predefined size range so that comparison testing of catalyst effectivity is easily accomplished.

Figure 1A:
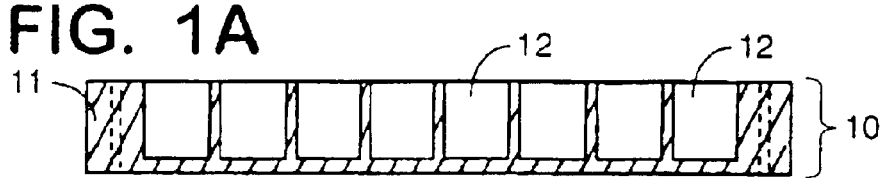
FIG. 1A is a cross sectional view through a catalyst containment module comprising a well plate.
Figure 1B:
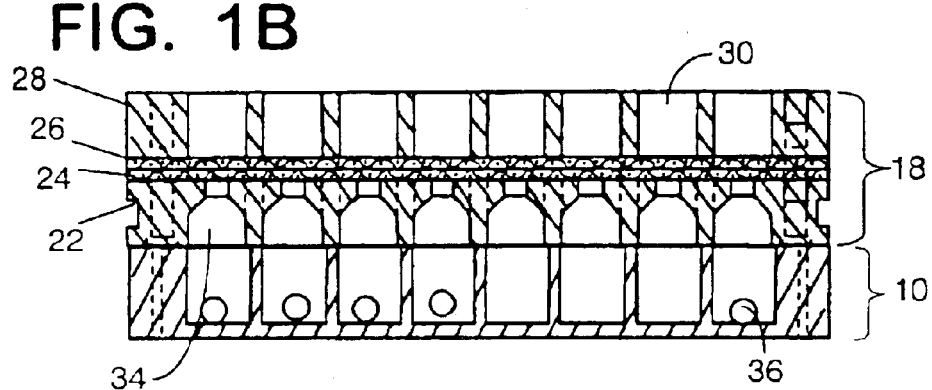
FIG. 1B is a cross sectional view showing one unit of a particle sizing module positioned over the catalyst containment module of FIG. 1.
Figure 2:
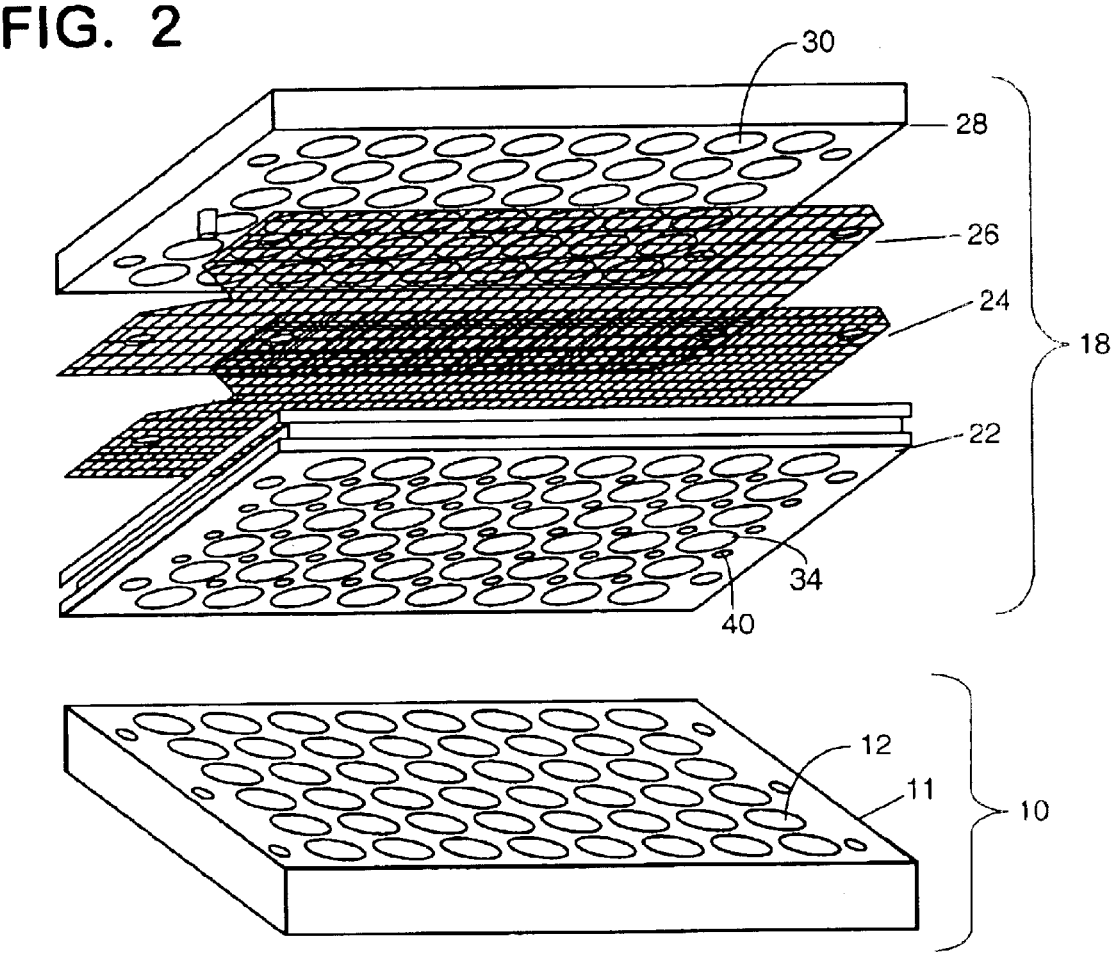
FIG. 2 is a perspective exploded view of the structures shown in FIG. 1B.

In the case where sizing, accomplished through sieving after grinding, is necessary, the containment module 10 is first overlaid with a grinding unit 18 of a particle sizing module 20, inverted thereover, as shown in FIGS. 1B and 2.

The grinding unit 18 comprises a grinding plate 22, a fine sizing screen 24, a coarse screen 26 for supporting the fine sizing screen 24 and a passthrough plate 28.

The passthrough plate 28 has a plurality of throughbores 30 therein which align with decreased diameter outlets 32 from grinding chambers 34 of the grinding plate 22 which in turn align with the wells 12 or vials 13 of containment module 10 when the module 10 and grinding unit 18 of particle sizing module 20 are engaged, as best shown in FIG. 1B.

The fine and coarse screens 24 and 26, respectively, are sandwiched between the grinding plate 22 and the passthrough plate 28 with the fine screen 24 preferably being positioned adjacent the grinding plate 22 and the screen adjacent the passthrough plate 28 being the coarse screen 26 for keeping grinding balls 36 positioned within each of the grinding chambers 34 from potentially damaging the fine sizing screen 24 during grinding of the particulate catalyst within each chamber 34.

Figure 1C:
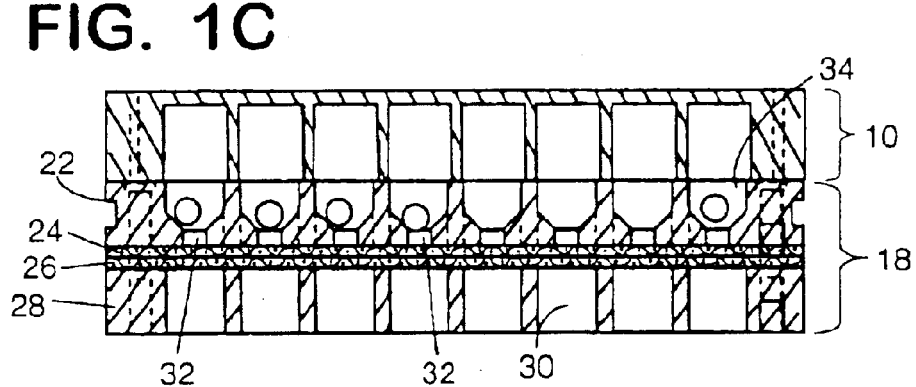
FIG. 1C is a cross sectional view showing the joined structures of FIG. 1B in an inverted position thereof.
Figure 1D:
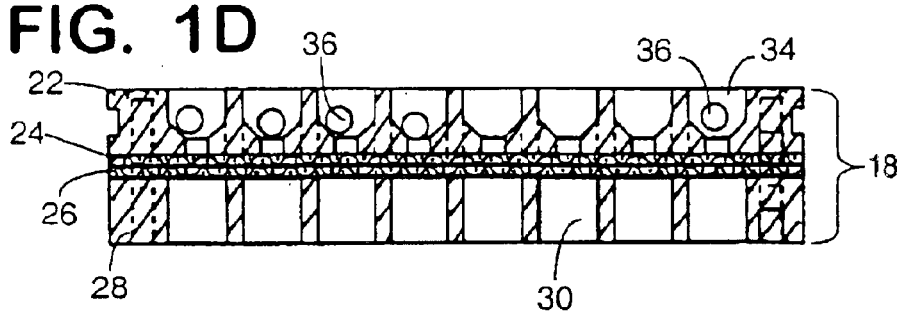
FIG. 1D is a cross sectional view showing the catalyst containment module having been removed after transfer of a catalyst samples therefrom to one unit of the particle sizing module.

With the containment module 10 and the grinding unit 18 of the particulate sizing module 20 engaged as shown in FIG. 1B, the modules are inverted, emptying the particulate catalyst into the grinding chambers 34 of the grinding plate 22, as illustrated in FIG. 1C.

The particulate catalyst is maintained within the grinding chambers 34 due to the fine sizing of the holes in the sizing screen 24 adjacent the grinding plate 22 and by the decreased diameter sizing of the outlet 32 of each grinding chamber 34. Any catalyst falling through is discarded.

Once the particulate catalysts have been transferred into the grinding chambers 34 of the grinding plate 22, the containment module 10 is removed. It will be understood that the spatial orientation of the catalyst samples within the grinding plate chambers 34 is now a mirror image of the original.

After the particulate catalyst is received within the grinding chambers 34, a grinding ball 36 is placed within each chamber 34, each grinding ball 36 facilitating grinding of the catalyst within the chambers 34 upon agitation of the sizing module as will be described hereinbelow. Alternatively, the grinding balls 36 may be placed in the wells 12 prior to inversion, as in FIGS. 1B and 1C.

Figure 15A:
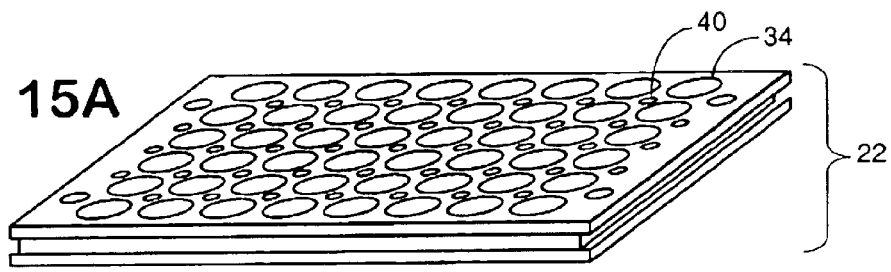
FIG. 15A is a perspective top view of a grinding plate of the sizing module.
Figure 15B:
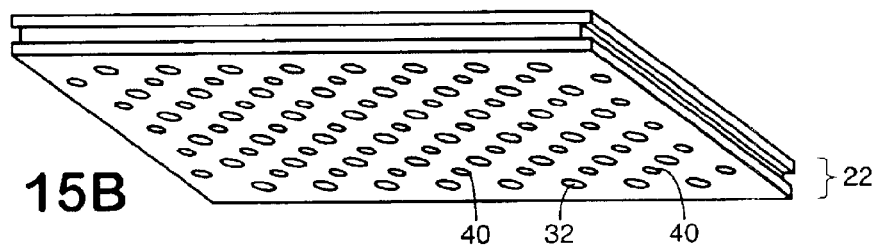
FIG. 15B is a perspective bottom view of the grinding plate.
Figure 15C:
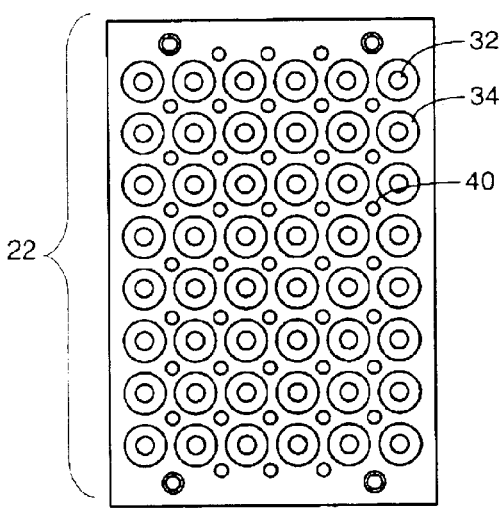
FIG. 15C is a top plan view of the grinding plate incorporating weight reduction holes.
Figure 15D:
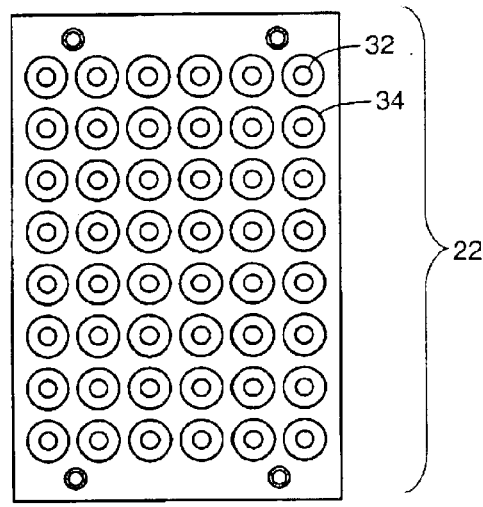
FIG. 15D is a top plan view of the grinding plate without weight reduction holes.
Figure 15E:
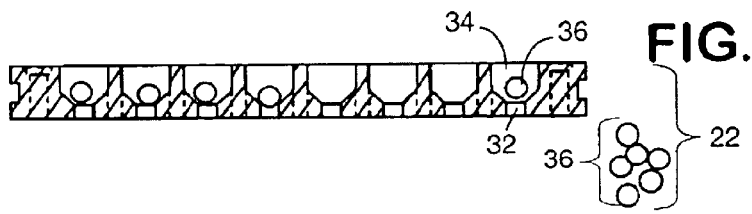
FIG. 15E is a cross sectional view through the grinding plate and shows grinding balls used therewith.
Figure 18A:
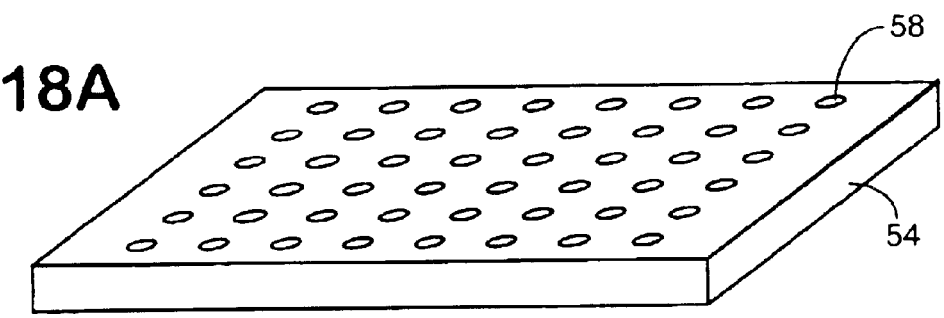
FIG. 18A is a perspective top view of a trap plate of the dosing module.
Figure 18B:
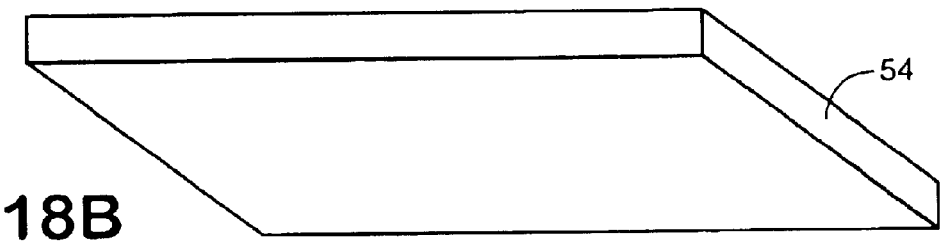
FIG. 18B is a perspective bottom view of the trap plate.
Figure 18C:
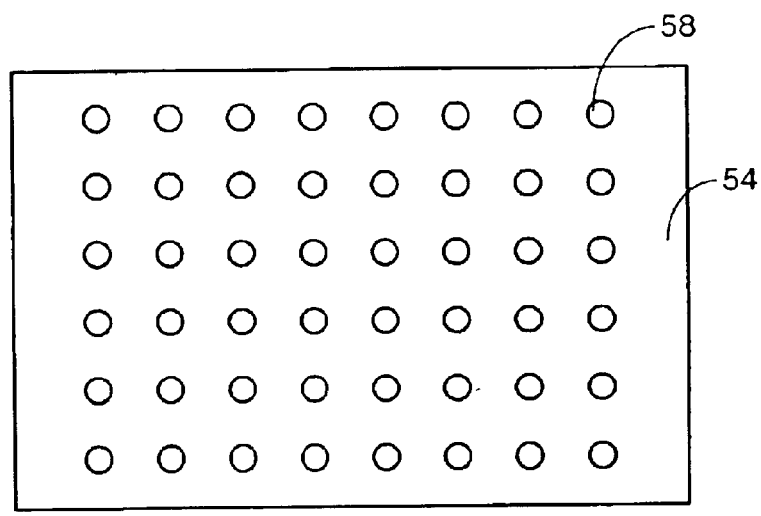
FIG. 18C is a top plan view of the trap plate.
Figure 18D:
FIG. 18D is a cross sectional view through the trap plate.
Figure 19A:
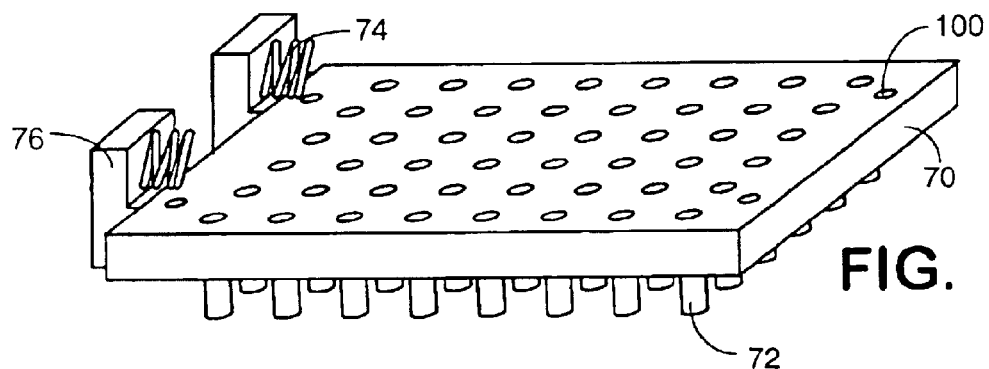
FIG. 19A is a perspective top view of a feed plate of the reactor feed module.
Figure 19B:
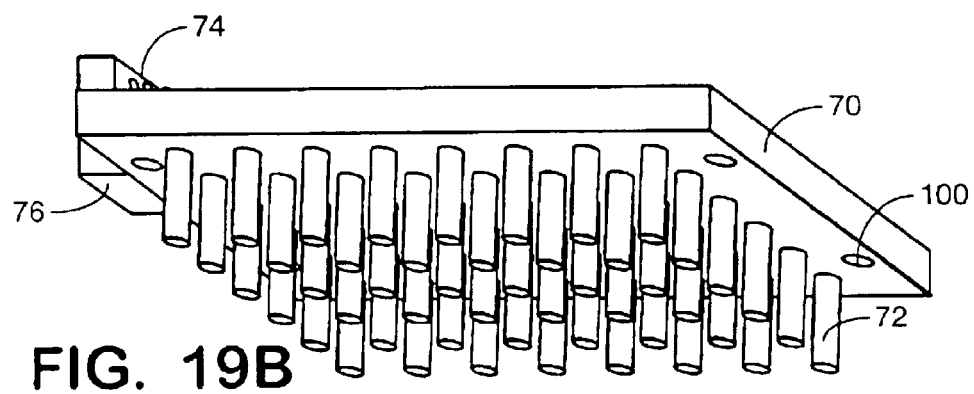
FIG. 19B is a perspective bottom view of the feed plate.
Figure 19C:
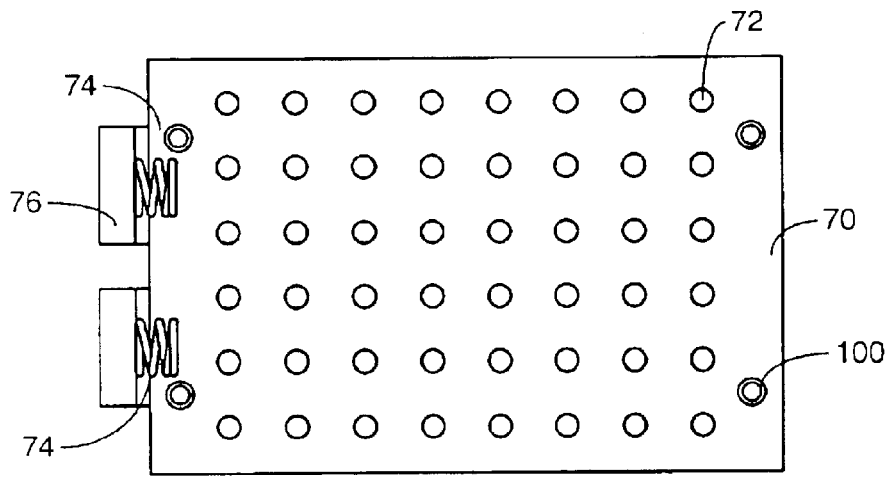
FIG. 19C is a top plan view of the feed plate.
Figure 19D:
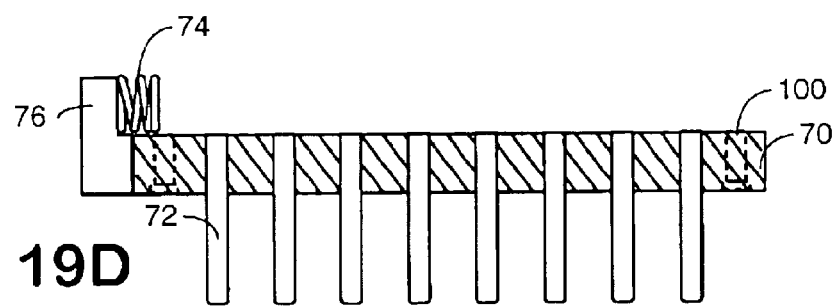
FIG. 19D is a cross sectional view through the feed plate.

It is proposed to manufacture the grinding plate 22 and grinding balls 36 of stainless steel for durability, etc., though this should not be construed as limiting. Further, if desired, to decrease weight of the grinding plate 22, bores 40 may be interspersed between the grinding chambers 34, eliminating some of the material of the plate 22, as shown best in FIGS. 15A–C.

Figure 3A:
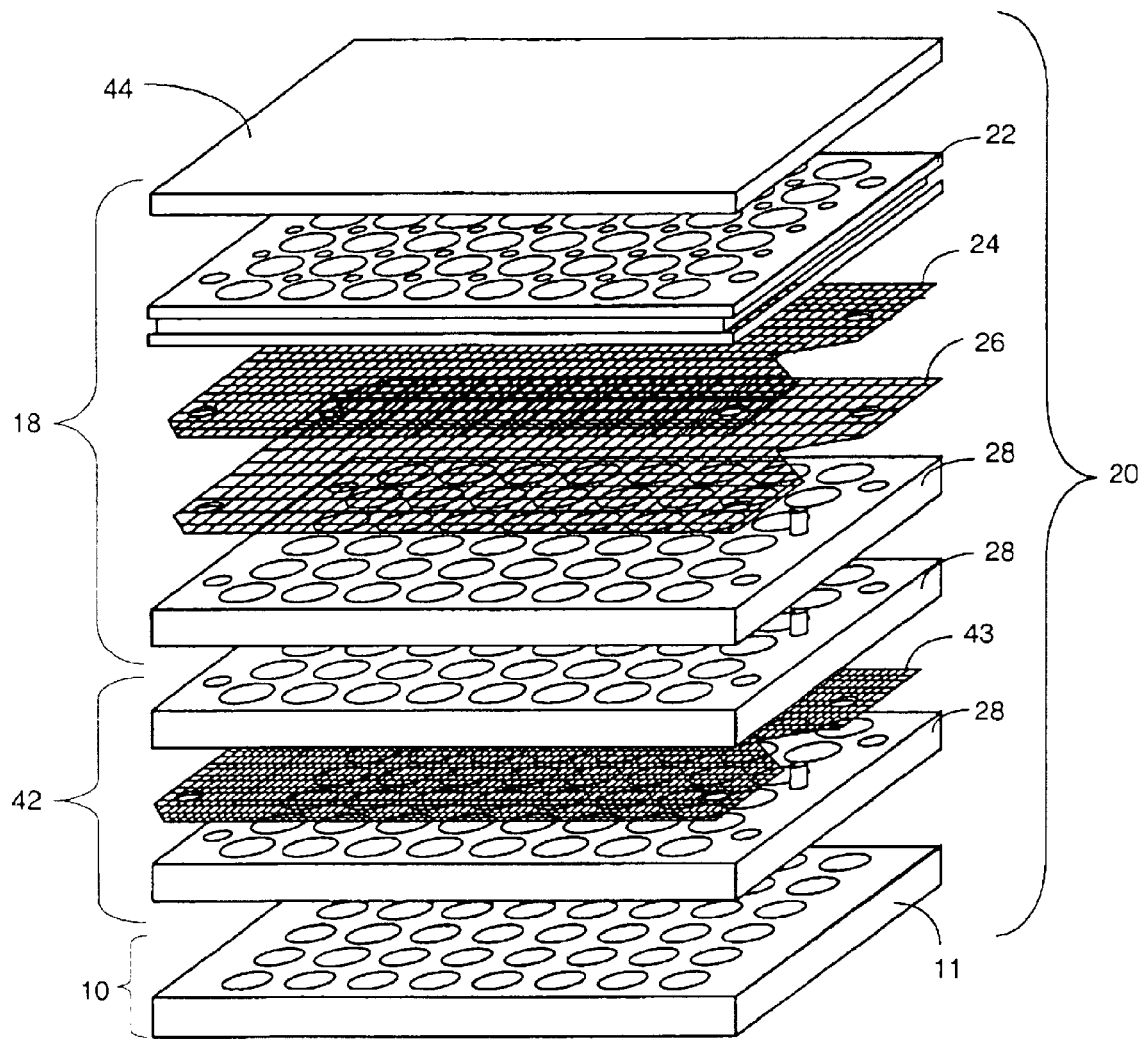
FIG. 3A is a perspective exploded view showing the entire sizing module.
Figure 3B:
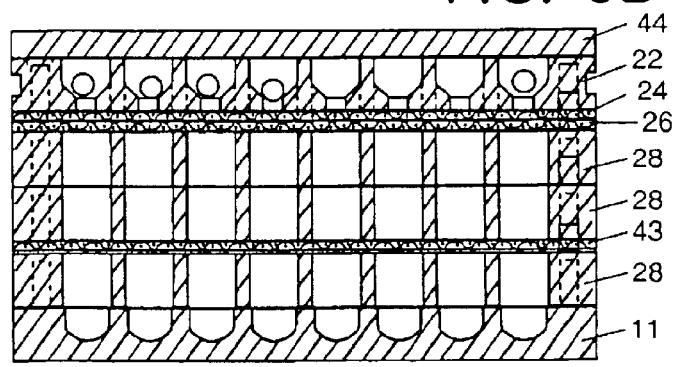
FIG. 3B is a cross sectional view through the sizing module of FIG. 3A.
Figure 6A:
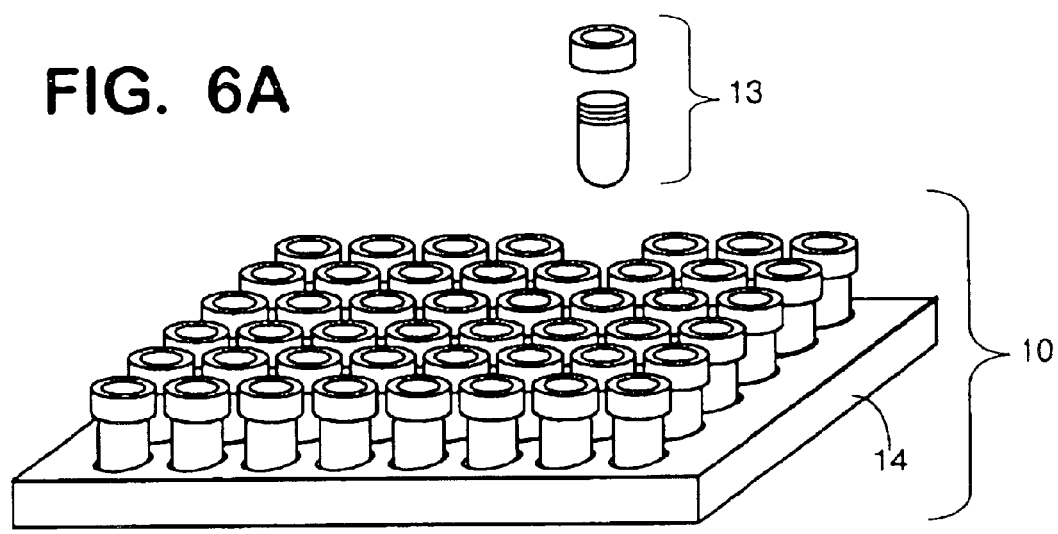
FIG. 6A is a perspective view of a containment module comprising a welled plate with vials within the wells.
Figure 6B:
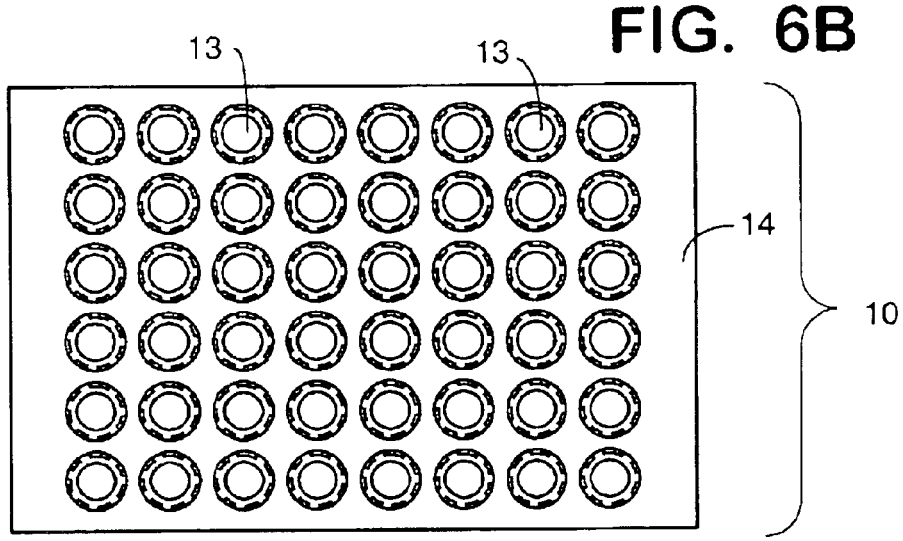
FIG. 6B is a top plan view of the module of FIG. 6A.
Figure 6C:
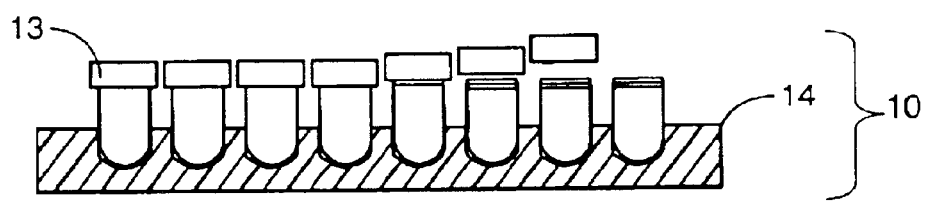
FIG. 6C is a cross sectional view through the module of FIG. 6A and shows covers being removed from the vials.
Figure 7A:
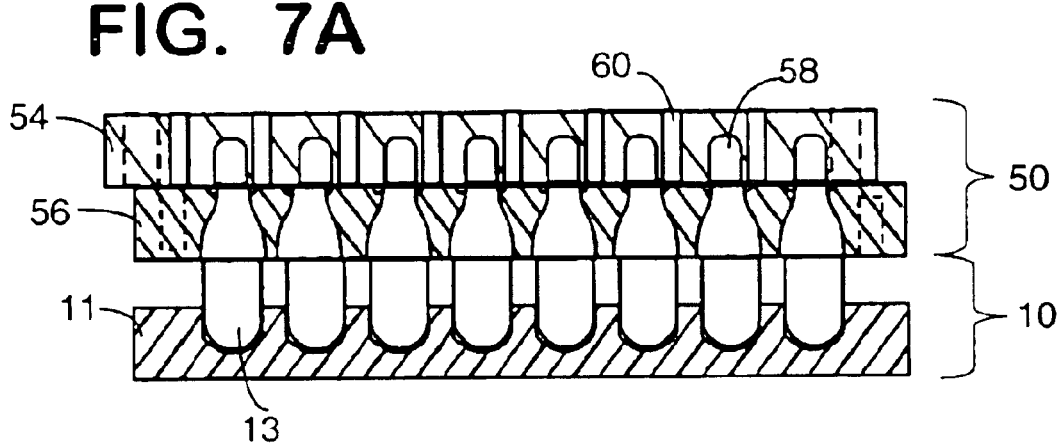
FIG. 7A is a cross sectional view showing the dosing module in the third position thereof positioned over open vials of a containment module.
Figure 7B:
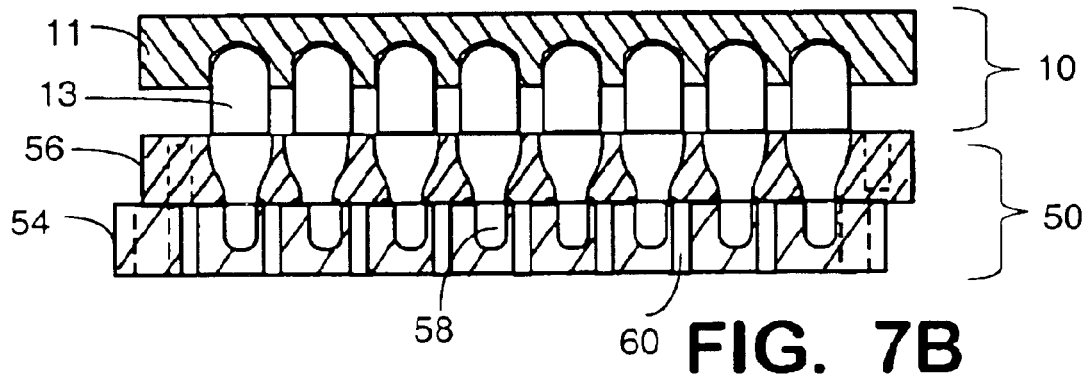
FIG. 7B is a cross sectional view of the structures of FIG. 7A in inverted position.
Figure 7C:
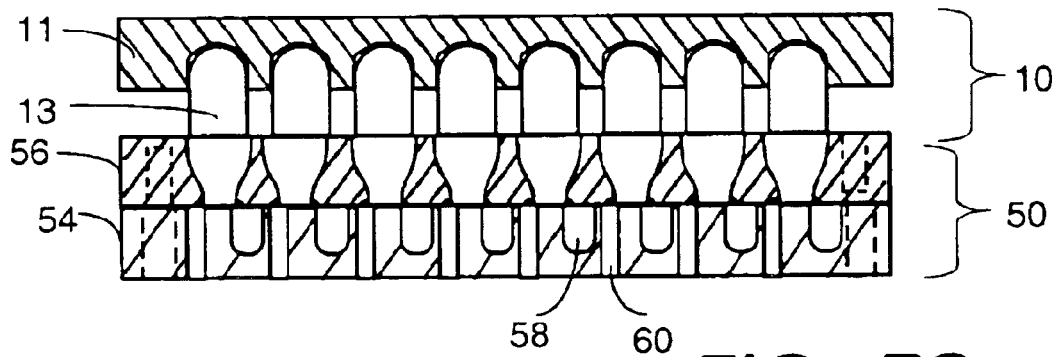
FIG. 7C is similar to FIG. 7B except the dosing module is shown in the second position thereof.

Turning now the FIGS. 3A and 3B, a particle capture unit 42 of the sizing module 20, is illustrated as set beneath the grinding unit 18 of the sizing module 20. The particle capture unit 42 will be seen to comprise two passthrough plates 28 having an ultrafine screen 43 sandwiched therebetween. A flat plate 44 is next positioned over the grinding unit 18, and a well plate 11 is then positioned beneath the particle capture unit 42 to form a bottom of the sizing module 20, completing the sizing module 20.

Once the complete sizing module 20 is formed, as shown in FIGS. 3A and B, the module 20 is agitated, in a known manner, and grinding of particulate catalyst is accomplished through action of the grinding balls 36 within the grinding chambers 34 of the grinding plate 22.

As the ground particulate catalyst is pulled through the fine sizing screen 24 through gravitational effect, the particulate catalyst with particle size greater than that of the holes in the ultrafine screen 43 becomes entrained on ultrafine screen 43 and finer particulate matter passes through the ultrafine screen 43 to be trapped in the well plate 11 therebeneath.

Upon ending agitation, the well plate 11 is removed and the content thereof is set aside. Next, the grinding unit 18 is removed and set aside, leaving the particle capture unit 42. Contained within the throughbores 30 of the passthrough plate 28 above the ultrafine screen 43 of the capture unit 42 is entrained particulate catalyst for use in testing, with the particles of each catalyst being substantially identical in size, i.e., smaller that the holes in the sizing screen 24 yet larger than the holes in the ultrafine screen 43, as best illustrated in FIGS. 5A.

A precision volume dosing module 50, illustrated in FIGS. 4A–C, 5B–D, 7A–C, 11A–C, 13A–D and 14A–D is next used to collect a precision volume of the catalyst samples from the particle capture unit 42 of the sizing module 20 for transfer to a reactor feed module 52, to be defined below. The precision volume dosing module 50 is seen to comprise two plates 54 and 56 which are engaged in a manner to be relatively movable.

A first or trap/drain combination plate (see brief description of 14A–14D) plate 54 of the dosing module 50 has wells 58 therein, each well 58 being virtually identical in size. In different applications, wells 58 may be of a different shape or size and a wide variety of precision volume chambers would be suitable in the present invention. Each well 58 has, in a preferred embodiment, a throughbore 60 associated therewith and positioned to one side thereof, as best illustrated in FIGS. 14A–D, though, in a secondary embodiment of the well plate 54 no throughbores are provided, as best illustrated in FIGS. 18A–D.

Illustrated best in FIGS. 13A–D, a second or funnel plate 56 of the precision volume dosing module 50 has a plurality of throughbores or funnels 62 therein which are of decreasing diameter, toward the well plate 54. Between the funnels 62, the material of the funnel plate 56 must be of sufficient extent, to cover both the wells 58 and throughbores 60, if both are present in the trap/drain combination plate 54 simultaneously. Likewise, the material of the trap/drain combination plate 54, between well 58 and throughbore 60 combinations thereof, must be of sufficient extent to cover outlets 64 of the funnels 62 in the funnel plate 56, when necessary.

As stated, the plates 54 and 56 of the dosing module 50 are movable relative to each other. In this respect, the precision volume dosing module 50 is placed over the capture unit 42 of the sizing module 20, in a manner positioning the funnel plate 56 adjacent the capture unit 42 (see FIG. 5B), and the thusly engaged modules are inverted together, placing the precision volume dosing module 50 on the bottom. It is preferred that the plates 54 and 56 interact through a tongue-and-groove interaction so that one plate does not lift or twist of the other.

The plates 54 and 56 of the dosing module 50 are normally aligned in the position shown in FIG. 4B where the outlets 64 of the funnels 62 in the funnel plate 56 rest against the material of the well plate 54, producing a normally closed position for communication between the wells 58 of the trap/drain combination plate 54 and the funnel 62 of the funnel plate 56 of the dosing module 50.

Once the dosing module 50 is positioned beneath the capture unit 42 of the sizing module 20, the plates 54 and 56 of the dosing module 50 are slid to the relative position shown in FIG. 4C, so that a volume of each catalyst drops into its respective well 58 in the trap/drain combination plate 54 under gravitational effect (see FIG. 5C). The original spatial format for the samples is now regained.

Once the wells 58 are full, the plates 54 and 56 are repositioned to their normally closed position shown in FIG. 4B, with a precision volume of each catalyst now being entrained in the wells 58. The capture unit 42 is now removed and the dosing module 50 may merely be inverted to eliminate excess particulate catalyst from within the funnels 62 of the funnel plate 56. Alternatively, when throughbores 60 are provided in the well plate 54, the outlet 64 of each funnel 62 in the funnel plate 56 may instead be aligned over a respective throughbore 60, with excess catalyst draining from within the funnels 62 through the respective throughbores 60 through gravitational effect (see FIG. 5D). Either way, a precision volume of each particulate catalyst sample remains entrained within the wells 58 of the well plate 54.

It will be understood, of course, that when catalyst samples are obtained from other than upstream processing and have previously been ground to particles of substantially similar size, the process of sizing need not be accomplished. However, in such instance, a precision volume of each catalyst sample must still be obtained in the manner described above. In this embodiment, the dosing module 50 cooperates with a containment module 10, as illustrated in exemplary fashion in FIGS. 7A–C, using the module 10 with vials 13 as an example, with steps of the dosing process above being carried out in identical fashion as described above.

Once a precision volume of samples has been obtained, in either above fashion, such samples must be loaded into reactors for testing. As will be understood, a test reactor (not shown) typically includes a plurality of elongate testing vessels which must be loaded with the particulate catalyst, preferably in a manner to place substantially all of each catalyst sample at the bottom of each respective vessel.

The desirability of bottom loading of the vessels relates to a number of requirements. First, dust is minimized, increasing efficacy of testing by maintaining greater equality of the precision volumes collected. Secondly, the height of the catalyst bed inherently affects testing results, such that a more equalized level of catalyst particles is created in the test tubes through bottom loading to further preclude inconsistencies in testing.

For these reasons also, it will be understood that surfaces within the precision volume dosing module 50 and a reactor feed module 52, to be defined below, must be smooth and fit together precisely, eliminating potential particulate loss through crevice formation, which particle loss would also provide testing inconsistencies.

To accomplish the goal of bottom loading in a manner substantially minimizing, if not altogether eliminating, potential inconsistencies, the reactor feed module 52 is proposed. The reactor feed module 52 is comprised of a funnel plate 56 which incorporates a plurality of funnels 62 therein and a feed plate 70 which incorporates a plurality of elongate feed conduits 72, extending therein and depending therefrom.

Figure 10A:
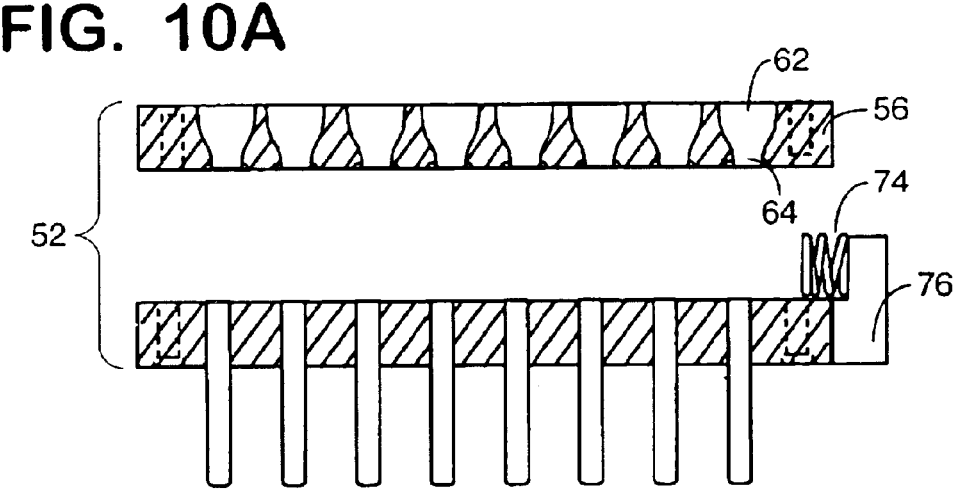
FIG. 10A is an exploded side view of a reactor feed module of the assembly.
Figure 10B:
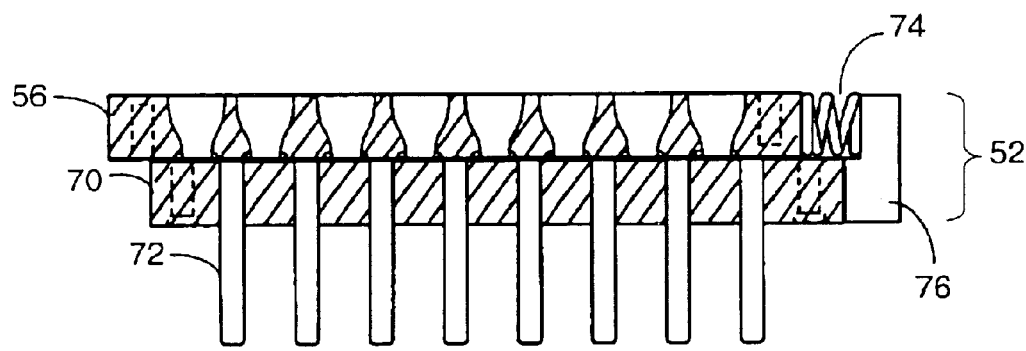
FIG. 10B is a side view of the reactor feed module in a first position thereof.
Figure 10C:
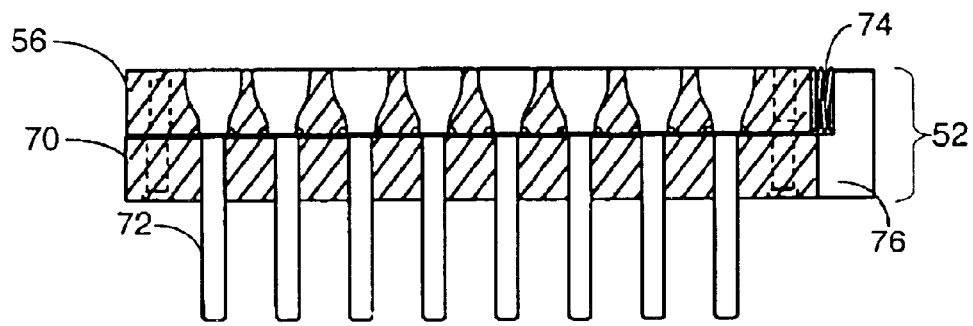
FIG. 10C is a side view of the reactor feed module in a second position thereof.

The plates 56 and 70 are slidingly engaged to each other and the feed plate 70 includes biasing structure 74 along one edge 76 thereof which maintains the plates 56 and 70 in the position shown in FIG. 10B, where communication between the funnel outlets 64 of the funnel plate 56 and the feed conduits 72 of the feed plate 70 is closed off.

Figure 11A:
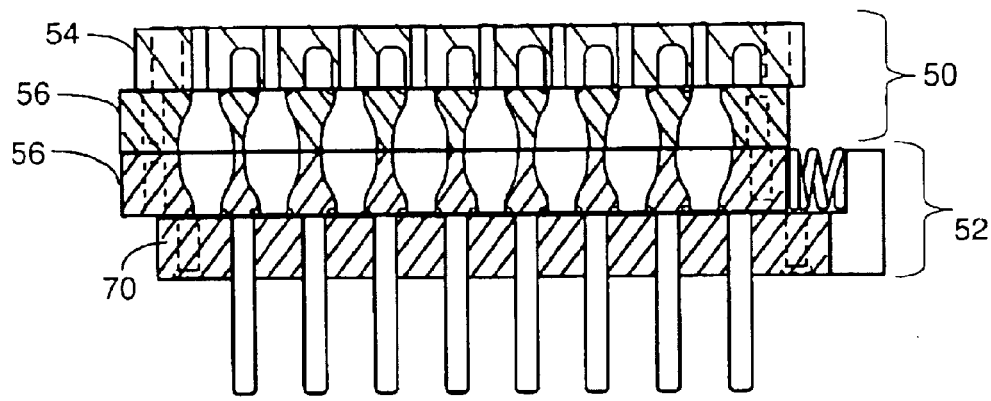
FIG. 11A is a side view showing the dosing module in the first position thereof positioned over the reactor feed module in the first position thereof.
Figure 11B:
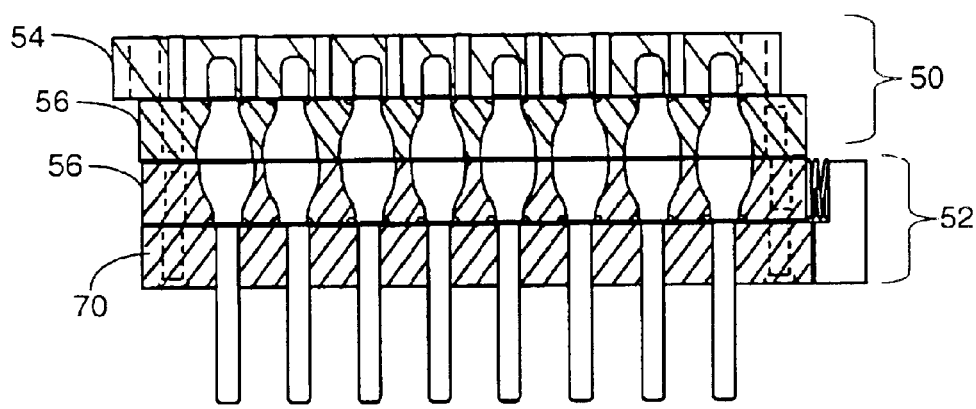
FIG. 11B is a side view showing the dosing module in the third position thereof positioned over the reactor feed module in the second position thereof.
Figure 11C:
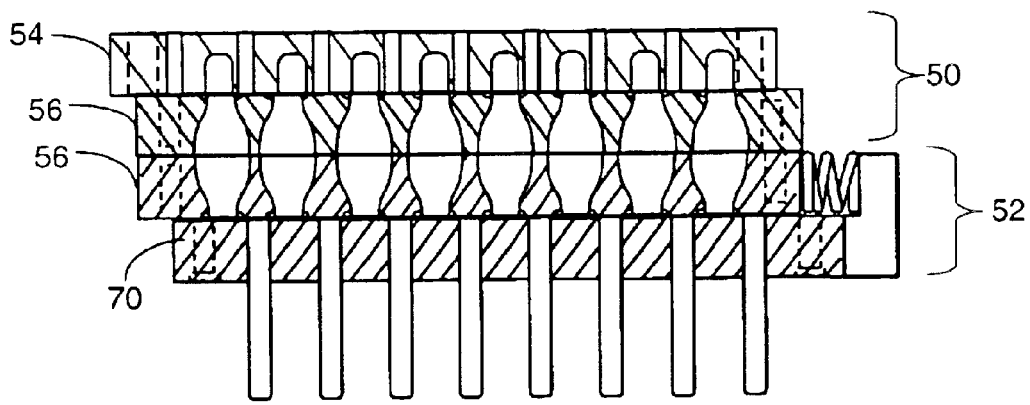
FIG. 11C is a side view showing the dosing module in the third position thereof positioned over the reactor feed module in the first position thereof.
Figure 12A:
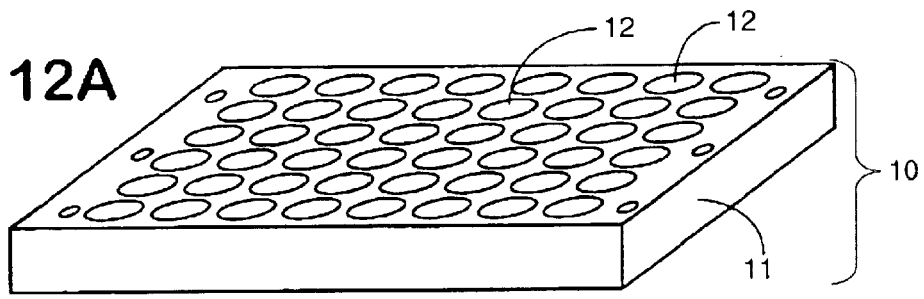
FIG. 12A is a perspective top view of one containment module.
Figure 12B:
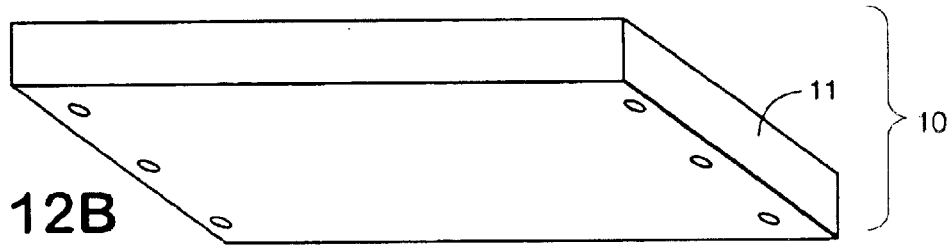
FIG. 12B is a perspective bottom view of the containment module of FIG. 12A.
Figure 12C:
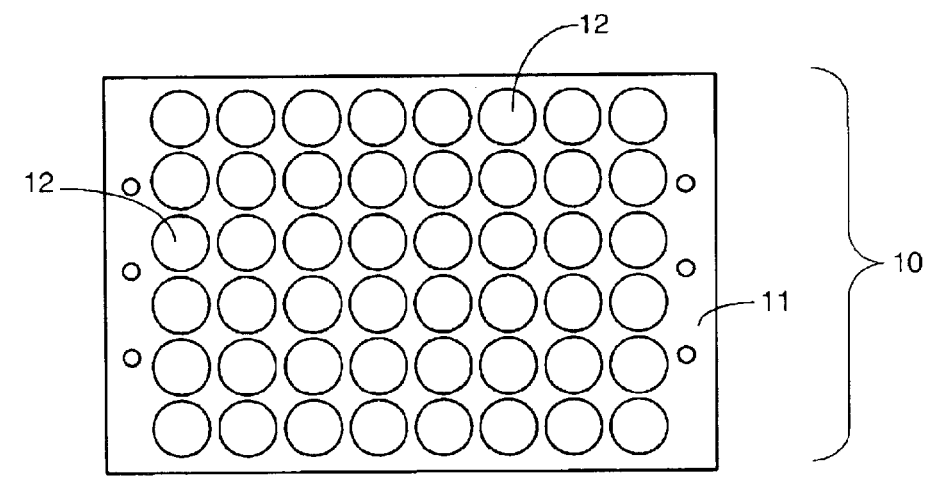
FIG. 12C is a top plan view of the containment module of FIG. 12A.
Figure 12D:
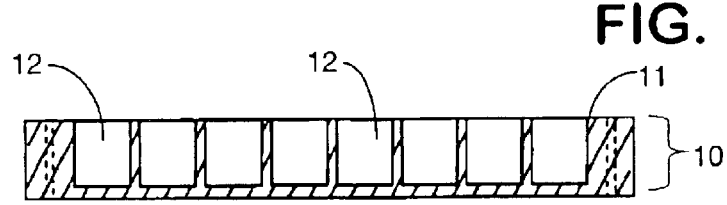
FIG. 12D is a cross sectional view through the containment module of FIG. 12A.
Figure 13A:
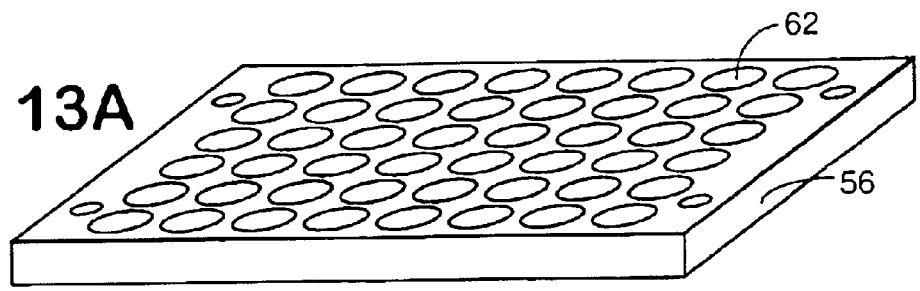
FIG. 13A is a perspective top view of a funnel plate of the dosing module.
Figure 13B:
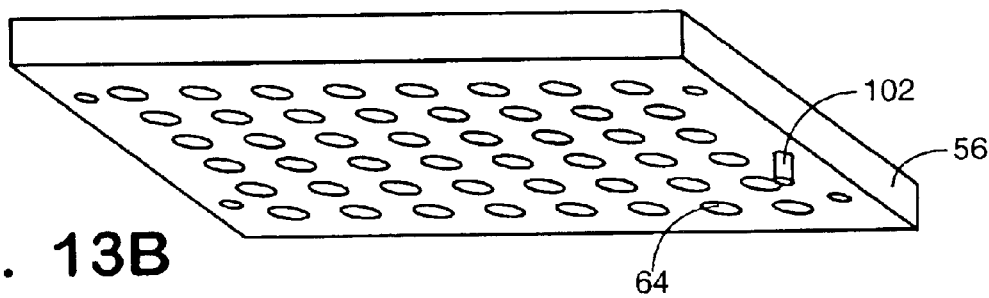
FIG. 13B is a perspective bottom view of the funnel plate of FIG. 13A.
Figure 13C:
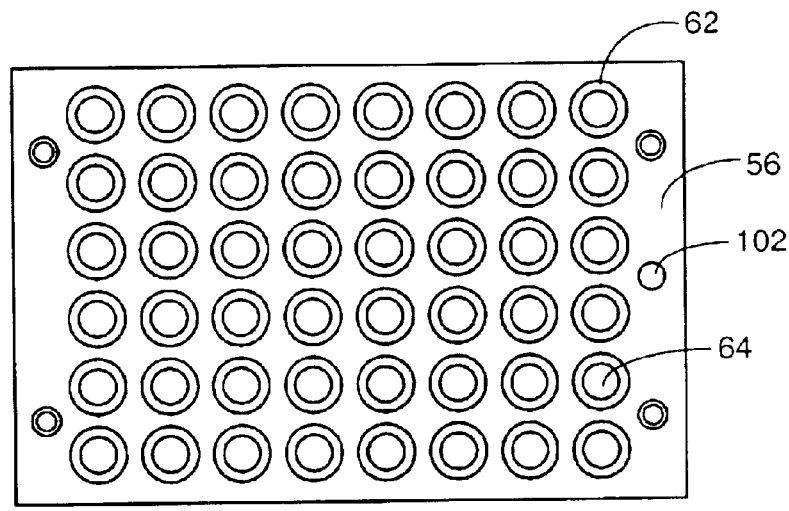
FIG. 13C is a top plan view of the funnel plate of FIG. 13A.
Figure 13D:
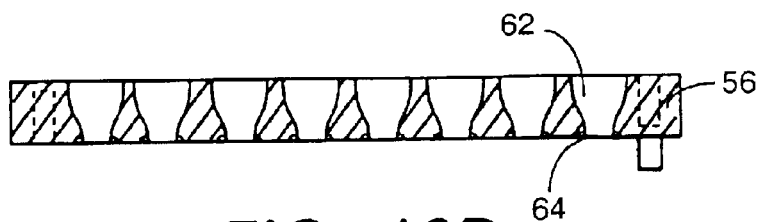
FIG. 13D is a cross sectional view through the funnel plate of FIG. 13A.
Figure 14A:
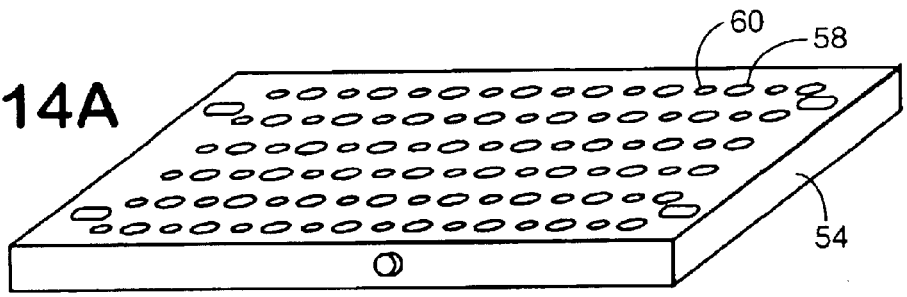
FIG. 14A is a perspective top view of a trap/drain combination plate of the dosing module.
Figure 14B:
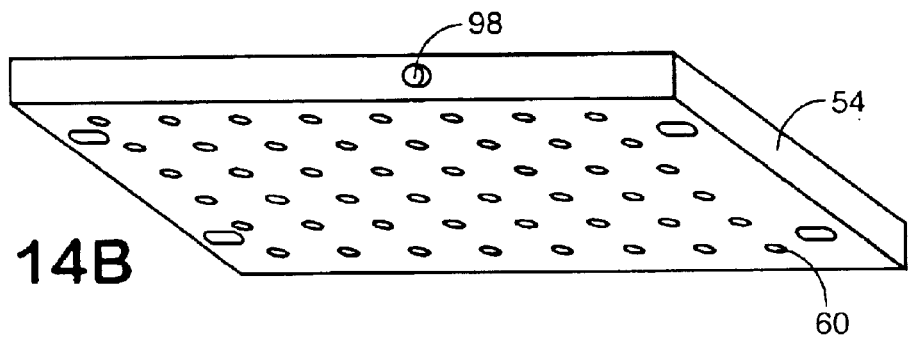
FIG. 14B is a perspective bottom view of the trap/drain combination plate.
Figure 14C:
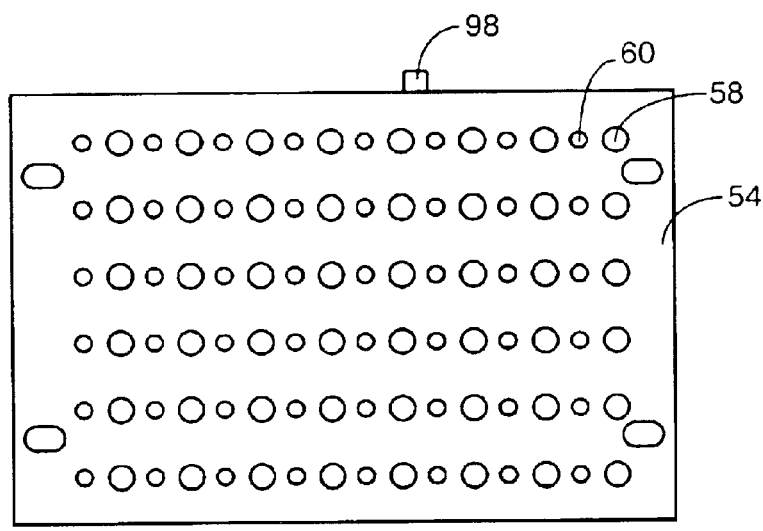
FIG. 14C is a top plan view of the trap/drain combination plate.
Figure 14D:
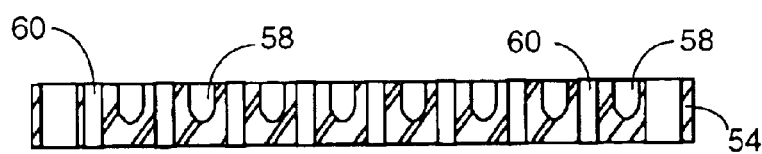
FIG. 14D is a cross sectional view through the trap/drain combination plate.

With the plates 56 and 70 of the reactor feed module 52 in this normally closed position the precision volume dosing module 50 is positioned over the reactor feed module 52 so that the funnel plates 56 of the modules 50 and 52 are contiguous, as shown in FIG. 11A.

At this point, feeding or loading of the reactor tubes may be accomplished by either of two methods. In one method, the particulate catalyst from the dosing module 50 may be loaded or transferred into the funnels 62 of the funnel plate 56 of the feed module 52, with the feed module 52 in its normally closed position, and the dosing module 50 can be removed, with the feed module 52 alone being used to load the particulate catalyst into the reactor tubes.

Here, once the feed conduits 72 of the feed plate 70 are positioned appropriately within the reactor vessels extending substantially the length of the reactor vessels, the funnel plate 56 is moved against and toward the biasing structure 74, here shown to comprise biasing springs 74, until the funnel outlets 64 align with the feed conduits 72 of the feed plate 70, loading the particulate catalyst into the bottom portion of each vessel of the reactor via the feed conduits 72 through gravitational effect.

In a second method, the dosing module 50 and reactor feed module 52 may remain engaged with the feed conduits 72 of the feed module 52 being inserted into the reactor vessels and then causing an alignment between the feed conduits 72, the funnel plates 56 of both modules 50 and 52 and the wells 58 of the trap/drain combination plate 54 of the dosing module 50, with loading or transfer then again occurring under gravitational effect. Using either method, it will be understood that the catalyst samples in the reactor vessels are arranged in mirror image of the original format.

At any point, if the original format is desired, it will be understood that an additional step of transferring the array of materials to any desired plate, such as the well plate 10, may be introduced. The result would be the elimination of the mirror image format and a return to the original format.

It will be appreciated that various modules of the assembly, at one time or another, are necessarily inverted during the described process of using the assembly, either individually or in combination. During such inversions, as well as during processing steps, such as grinding, it is imperative that the modules and/or units thereof be maintained against the possibility of separation. To this end, there is proposed a framework module 80 of the assembly, as illustrated in FIGS. 8A–C and 9A–B.

Inasmuch as the framework module 80 may be structured in a plurality of embodiments while still affording the benefits required thereof, two exemplary embodiments are disclosed, though these should not be construed as limiting. As shown, both embodiments offer a bottom wall 82, end walls 84, side walls 86, and a top wall 88 creating a box like structure. The framework modules 80 are also similarly sized, to accommodate a snug side to side fit of modules which interact therewith, to keep same from shifting therewithin while being inverted, agitated, etc.

It will be seen that the side walls 86 are partial or incomplete, one extending upwardly from the bottom wall 82 and another depending from the top wall 88 which is pivotably engaged to one end wall 84 by a hinge 90 in the embodiment of FIGS. 8A–C. The partial side walls 86 take the form of flanges 86 extending the entire vertical extent of the framework module 80.

Figure 9A:
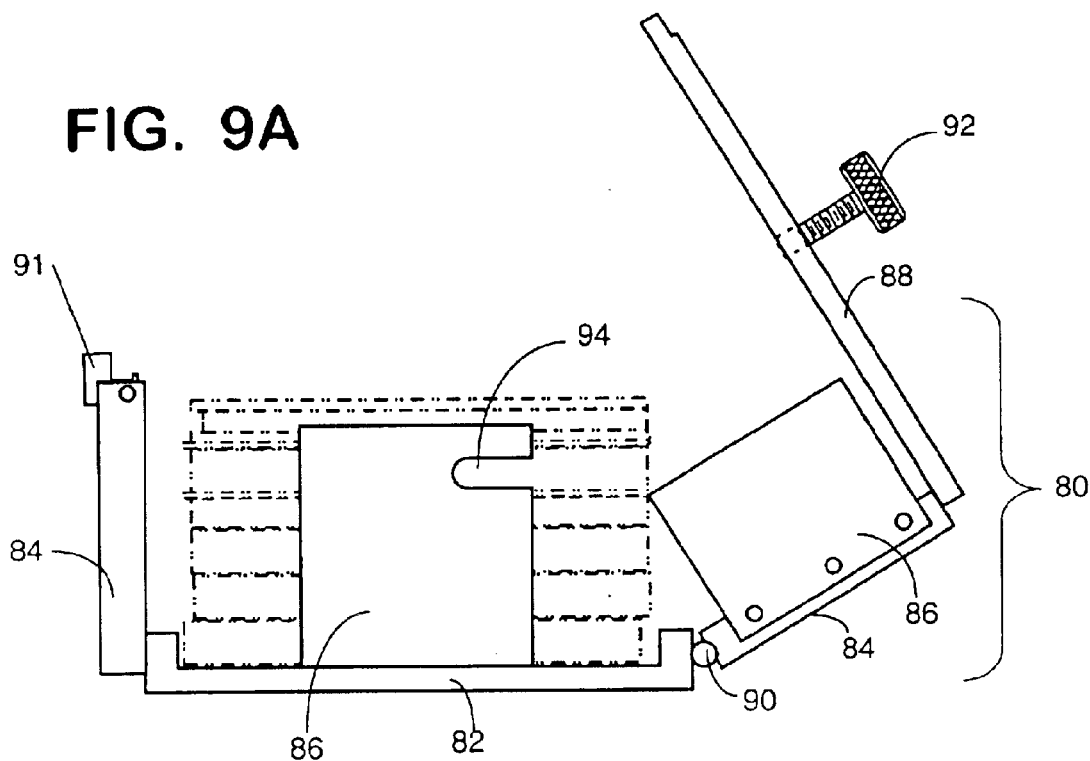
FIG. 9A is a side view of an alternate embodiment of a framework module in an open position.
Figure 9B:
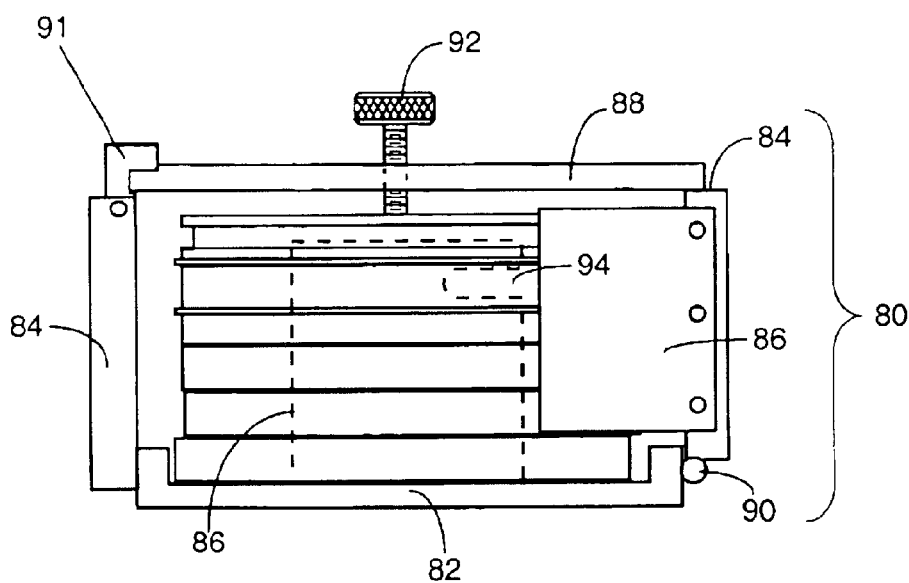
FIG. 9B is an opposite side view of the framework module of FIG. 9A in a closed position.

In the embodiments of FIGS. 9A–B, one end wall 84 is engaged to the top wall 88, with the two walls pivoting together about a hinge 90 positioned between the bottom wall 82 and the end wall 84. Also, in this embodiment, one side wall 86, rather than engaging the top wall 88, engages the pivotable end wall 84, extending laterally inwardly therefrom.

It will be understood that the framework module 80 is lockable by any suitable locking mechanism 91 to maintain integrity of the framework module 80 and hence the various modules located therein during manipulations required for processing.

As should be understood from the above description, some of the modules, and/or combinations thereof, when positioned within the framework module 80, will not fill the entire vertical extent of the framework module 80. To accommodate such lack in height, it is proposed to provide at least one, and preferably more than one biasing mechanism 92, such as the bolts 92 or biasing pins 92 shown, by means of which module units, plates or entire modules can be compressed together, within the framework module 80, regardless of vertical extent thereof.

It will be understood, of course, that additional plates, such as flat plate 44, may be used, when necessary, within the framework module 80 to fill any "slack" vertical space within the framework module 80, to assure that modules therewithin are compressed together.

Such accommodative mechanism 92 is necessary to assure against loss of particulate catalyst during procedures such as the inverting, agitation, etc., described above.

Further, it will be seen that a horizontal notch 94 is provided in one of the partial side walls 86 which aligns with an actuating pin 98 (FIGS. 14B and 14C) provided on the trap/drain combination plate 54 of the dosing module 50. The actuating pin 98 serves to slide the trap/drain combination plate 54 to a position where particulate catalyst is trapped in the wells 58, as previously described.

Of course, it will be understood that the trap/drain combination plate 54 will be positioned within the framework module 80 to place the pin 98 into alignment with the notch 94 through addition of as many flat plates 44 as necessary, above and below the dosing module 50. Also, if desired, cooperating alignment bores 100 and pins 102, or the like may be provided on various structures of the assembly 10 for assured alignment therebetween.

Still further, it will be understood that, through use of the assembly and method disclosed herein, the samples are easily identifiable throughout processing to the spatial orientation thereof, which is consistently maintained throughout the process, either in beginning or mirror image form.

As described above, the method and assembly of the present invention provide a number of advantages, some of which have been described above and others of which are inherent in the invention. Also modifications may be proposed to the teachings herein which are still within the scope of the invention. For example, vessels other than reactor vessels, such as adsorbent or separation vessels would just as easily be accommodated by the method and assembly of the present invention. Accordingly, the invention is only to be limited as necessitated by the accompanying claims.

What is claimed is:

1. A method for handling a plurality of materials comprising the steps of:
   simultaneously sizing the materials to a predetermined substantially identical size by simultaneously grinding the materials and simultaneously sieving the ground materials to collect only substantially identically sized particles;
   simultaneously collecting substantially identical precision volumes of the substantially identically sized materials; and
   simultaneously depositing the precision volumes of the materials into feed conduits and loading into an array of vessels in a manner where the materials are in continuously identifiable spatial orientation throughout the steps of the method.

2. The method of claim 1 wherein the substantially identical sized materials are in the form of substantially identically sized particles.

3. The method of claim 1 wherein the step of grinding the materials is accomplished through use of a grinding unit.

4. The method of claim 3 wherein the step of sieving includes capturing particles of predetermined size which pass through the screen of the grinding unit using at least one sizing screen.

5. The method of claim 3 wherein the step of grinding the materials further comprises capturing particles larger than the predetermined size using a screen of the grinding unit.

6. The method of claim 1 wherein the step of sieving is accomplished through use of a particle capture unit.

7. The method of claim 6 wherein particles smaller than the desired predetermined size pass through the particle capture unit and are eliminated.

8. The method of claim 1 wherein said step of simultaneously collecting a substantially identical precision volume of each material is accomplished by simultaneously transferring at least a portion of each of the materials to completely fill a respective well of a well plate wherein all the wells are substantially identical in size.

9. The method of claim 8 wherein the step of transferring the materials to the wells employs aligned funnels of a funnel plate which is movably engaged to said well plate.

10. The method of claim 9 further including the step of moving the aligned funnels out of alignment with the wells once the wells are filled thereby sealing the wells and ensuring a precision volume of material in each well.

11. The method of claim 10 wherein material remaining in the funnels of the funnel plate after the wells are sealed is eliminated.

12. The method of claim 8 wherein the materials are simultaneously transferred to the well plate from a capture unit of a sizing module.

13. A method for handling a plurality of materials comprising the steps of:
   simultaneously collecting substantially identical precision volumes of substantially identically sized materials; and
   simultaneously depositing the precision volumes of the materials into feed conduits and loading into an array of vessels in a manner where the materials are in continuously identifiable spatial orientation throughout the steps of the method
   wherein the steps of collecting a substantially identical precision volume and simultaneously depositing the precision volume of each material into a respective feed conduit for loading into a respective vessel are accomplished by:
      collecting a precision volume of material in a well plate having a funnel plate movably engaged thereover;
      moving the funnel plate so the funnels are no longer aligned with the wells thereby sealing the wells of the well plate;
      eliminating excess material remaining in the funnel plate;
      inverting the engaged funnel and well plates over the feed conduits; and
      sliding the funnels into alignment with both the conduits and the wells so material from each well passes into a corresponding conduit.

14. The method of claim 13 wherein material remaining in the funnels of the funnel plate after the wells are sealed is eliminated.

15. The method of claim 13 wherein the step of simultaneously depositing the precision volume of each material into a respective feed conduit for loading into vessels is accomplished by:
   collecting a precision volume of material in a well plate having a funnel plate movably engaged thereover;
   moving funnels of the funnel plate out of alignment with the wells thereby sealing the filled wells of the well plate and discarding the excess material remaining in the funnels;
   inverting the engaged funnel and well plates over the feed conduits; and
   sliding the funnels into alignment with both the conduits and the wells so material from the wells passes into a respective conduit.

16. The method of claim 13 wherein the step of simultaneously collecting a precision volume involves transferring materials from a containment module containing the materials in a spatially identifiable format to the well plate having a funnel plate movably engaged thereover while retaining a spatially identifiable format.

17. A method for handing a plurality of materials, each material previously substantially identically sized, said method comprising the steps of:
   simultaneously collecting a substantially identical precision volume of each material by simultaneously transferring each of the materials to fill a respective well of a well plate wherein all the wells are substantially identical in size, wherein the transferring the materials to the wells involves passing the materials through aligned funnels of a funnel plate which is movably engaged to said well plate, moving the aligned funnels out of alignment with the wells once the wells are filled through tongue-and-groove sliding of the funnels and the wells relative to each other, sealing the wells and ensuring a precision volume in each well; and
   simultaneously depositing the collected precision volume of each material into feed conduits and loading into vessels in a manner where the materials are in continuously identifiable spatial orientation throughout the steps of the method.

* * * * *